(No Model.)
O. L. SPAULDING, Jr.
AXLE BEARING FOR BICYCLES.
No. 408,902.  Patented Aug. 13, 1889.
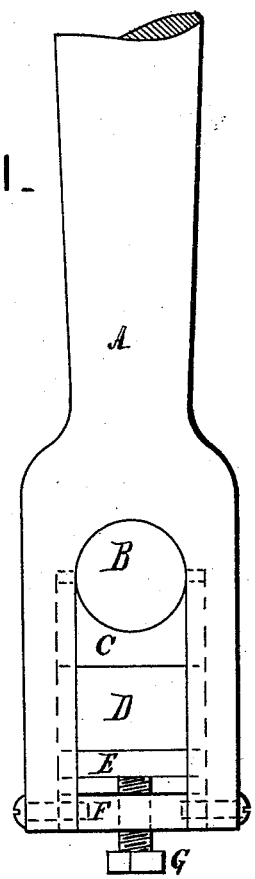
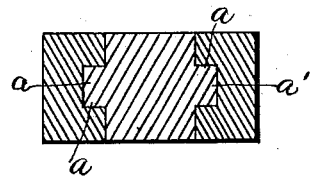
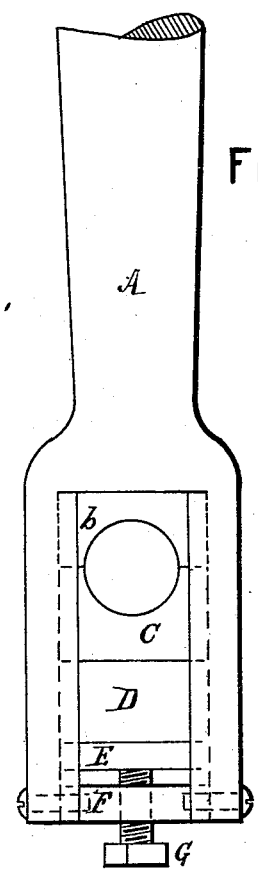
WITNESSES
Fred. W. Falkiner
L. A. Doelty
INVENTOR
Oliver L. Spaulding Jr.
By Wells W. Leggett & Co.
Attorneys.

UNITED STATES PATENT OFFICE.

OLIVER L. SPAULDING, JR., OF ST. JOHN'S, MICHIGAN.

AXLE-BEARING FOR BICYCLES.

SPECIFICATION forming part of Letters Patent No. 408,902, dated August 13, 1889.

Application filed June 10, 1889. Serial No. 313,730. (No model.)

*To all whom it may concern:*

Be it known that I, OLIVER L. SPAULDING, Jr., a citizen of the United States, residing at St. John's, county of Clinton, State of Michigan, have invented a certain new and useful Improvement in Axle-Bearings for Bicycles, &c.; and I declare the following to be a full, clear, and exact description of the invention, such as will enable others skilled in the art to which it pertains to make and use the same, reference being had to the accompanying drawings, which form a part of this specification.

My invention has for its object the production of a cheap, durable, and efficient bearing for the axles of bicycles, velocipedes, and the like, and relates more particularly to the bearings for the front or drive wheel, although it can also be applied to other wheels.

In the drawings, Figure 1 is a side elevation of a portion of the standard or fork of a bicycle, showing my improved bearing with the axle shown in section. Fig. 2 is a horizontal section of the same through the rubber cushion. Fig. 3 is a variation.

In carrying out my invention, A represents one side of the upright standard or fork of the ordinary bicycle, in which the front wheel is journaled. This standard is at its lower end divided and embraces the axle B. The end of the standard may be so constructed as to serve for the upper bearing for the axle, as shown in Fig. 1, or, if desired, a separate piece $b$ may be inserted for the upper bearing, as shown in Fig. 3.

C is the lower bearing or holder. Beneath the bearing C is a block of rubber or equivalent D, which serves the purpose of a cushion to constantly keep the lower bearing against the axle and yet not cause it to bind.

E is a metal plate beneath the rubber D and serves to protect the latter.

F is another metallic plate, which may be rigidly fastened to the ends of the standard by screws or other means.

G is a set-screw passing through the plate F and bearing against the plate E. By means of this set-screw the tension on the rubber, and consequently on the axle-bearing, can be easily regulated.

In order to prevent any of the parts from shaking loose or dropping out of their place I prefer to provide the sides of the standard with grooves $a$ and to provide each piece with a tenon $a'$, so that the parts when slipped into place are securely held in position and can only be removed by loosening the set-screw G and removing the plate F.

This form of bearing is especially applicable to bicycles, velocipedes, and the like, where the weight and friction come principally on the upper or stationary bearing and where the lower bearing simply serves to keep the axle in place, the rubber cushion serving to take up any play of the parts and keep them snugly in their places, and yet being cheap and simple.

What I claim is—

1. A bearing or boxing for the axles of bicycles, velocipedes, and the like, consisting of an upper or stationary bearing, a lower or movable bearing, a cushion below said lower bearing, and means for keeping the cushion closely against the lower bearing, substantially as described.

2. A bearing or boxing for the axles of bicycles, velocipedes, and the like, consisting of the combination, with the standard, of a stationary bearing located above the axle, a movable bearing located below the axle, a cushion located below said lower bearing, and a set-screw for increasing or decreasing the tension on said cushion, all said parts engaged to said standard by groove-and-tenon engagements, substantially as described.

In testimony whereof I sign this specification in the presence of two witnesses.

OLIVER L. SPAULDING, JR.

Witnesses:
O. L. SPAULDING,
GEORGE WILLIAMS.